United States Patent
Kubota

(10) Patent No.: US 9,323,081 B2
(45) Date of Patent: Apr. 26, 2016

(54) LIQUID CRYSTAL DISPLAY APPARATUS AND METHOD OF MANUFACTURING THE SAME

(71) Applicant: Japan Display Inc., Minato-ku (JP)

(72) Inventor: Naoya Kubota, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 9 days.

(21) Appl. No.: 14/296,935

(22) Filed: Jun. 5, 2014

(65) Prior Publication Data

US 2015/0009457 A1   Jan. 8, 2015

(30) Foreign Application Priority Data

Jul. 8, 2013  (JP) .................. 2013-142623

(51) Int. Cl.
*G02F 1/1337* (2006.01)
*G02F 1/1333* (2006.01)
*G02F 1/13* (2006.01)

(52) U.S. Cl.
CPC ............ *G02F 1/1333* (2013.01); *G02F 1/1303* (2013.01); *G02F 1/133351* (2013.01); *G02F 2001/133354* (2013.01); *Y10T 29/49002* (2015.01)

(58) Field of Classification Search
CPC ............ G02F 1/133528; G02F 1/1333; G02F 1/1303; G02F 1/133351; G02F 1/133707; G02F 2001/133765
USPC ............................................ 349/96, 191, 187
See application file for complete search history.

(56) References Cited

U.S. PATENT DOCUMENTS

| | | | |
|---|---|---|---|
| 6,307,613 B1* | 10/2001 | Iida ............................. | 349/158 |
| 8,416,370 B2* | 4/2013 | Yokogawa .................. | 349/96 |
| 2009/0002607 A1* | 1/2009 | Kubota et al. ............... | 349/96 |

FOREIGN PATENT DOCUMENTS

| | | | |
|---|---|---|---|
| JP | 2004-354807 | | 12/2004 |
| JP | 2009-157140 | | 7/2009 |
| JP | 2012194475 | A * | 10/2012 |

* cited by examiner

*Primary Examiner* — Thanh-Nhan P Nguyen
(74) *Attorney, Agent, or Firm* — Oblon, McClelland, Maier & Neustadt, L.L.P.

(57) ABSTRACT

A method of manufacturing a liquid crystal display apparatus includes adhering an array substrate and a counter substrate to form a liquid crystal cell; injecting liquid crystal between the array substrate and the counter substrate; adhering an optical film having been cut away at one corner thereof in a triangular shape on the surface of the counter substrate: and mounting a back light to the liquid crystal cell by aligning a corner of the liquid crystal cell and a corner of the back light on the notched portion.

9 Claims, 5 Drawing Sheets

LIQUID CRYSTAL DISPLAY APPARATUS AND METHOD OF MANUFACTURING THE SAME

CROSS-REFERENCE TO RELATED APPLICATION

This application is based upon and claims the benefit of priority from the prior Japanese Patent Application No. 2013-142623, filed on Jul. 8, 2013; the entire contents of which are incorporated herein by reference.

FIELD

Embodiments of the present invention relate to a liquid crystal display apparatus and a method of manufacturing the same.

BACKGROUND

A liquid crystal cell includes an array substrate and a counter substrate adhered to each other and liquid crystal injected therebetween. Front surfaces of the array substrate and the counter substrate each have an optical film such as a polarizing plate or a retardation film adhered thereto.

In recent smart phones or the like, frame narrowing that narrows an outside portion of a display area is required for enlarging a display area with a limited liquid crystal cell size.

However, when adhering an optical film on a liquid crystal cell with a narrowed frame as described above, the position of adhesion is affected by repeating accuracy of an adhering apparatus and outline accuracy of the optical film or a glass substrate. Therefore it is difficult to adhere the film always at the same position.

Therefore, as illustrated in FIG. 6, when a corner of an optical film 20 protrudes from a corner of the counter substrate 14 as a result of adhesion, the protruded corner of the optical film 20 is erroneously recognized as the corner of the counter substrate 14 in a process of mounting a back light to a liquid crystal cell. Therefore, the position of the counter substrate cannot be determined, so that a problem the back light cannot be mounted on the liquid crystal cell accurately arises.

In view of such a problem described above, it is an object of the present invention to provide a liquid crystal display apparatus which allows a liquid crystal cell and a back light to be mounted correctly even though the liquid crystal cell is subjected to frame narrowing and a method of manufacturing the same.

DETAILED DESCRIPTION

According to embodiments, the embodiment provides a method of manufacturing a liquid crystal display apparatus including: forming a liquid crystal cell, in which a liquid crystal layer is held between an array substrate and a counter substrate; adhering an optical film having a notched portion formed by cutting at least one of corners away on a front surface of the array substrate or the counter substrate of the liquid crystal cell; aligning a corner of the liquid crystal cell and a corner of a back light at the notched portion of the optical film; and mounting the back light so as to overlap with the liquid crystal cell.

The embodiment of the present invention provides a liquid crystal display apparatus including a liquid crystal cell having an array substrate and a counter substrate adhered to each other by the intermediary of a liquid crystal layer and a back light, wherein at least one of four corners of an optical film to be adhered to the counter substrate is cut away to form a notched portion.

According to the embodiments of the invention, since the corner of the optical film adhered to the counter substrate is cut away to form the notched portion, even though the optical film is adhered to the liquid crystal cell with a narrowed frame so as to protrude from the counter substrate, the corner of the liquid crystal cell and the corner of the back light are exposed from the notched portion so that accurate alignment between the liquid crystal cell and the corner of the back light is achieved.

A liquid crystal display apparatus 1 and a method of manufacturing the same according to an embodiment of the invention will be described with reference to FIG. 1 to FIG. 5.

Figure 4:
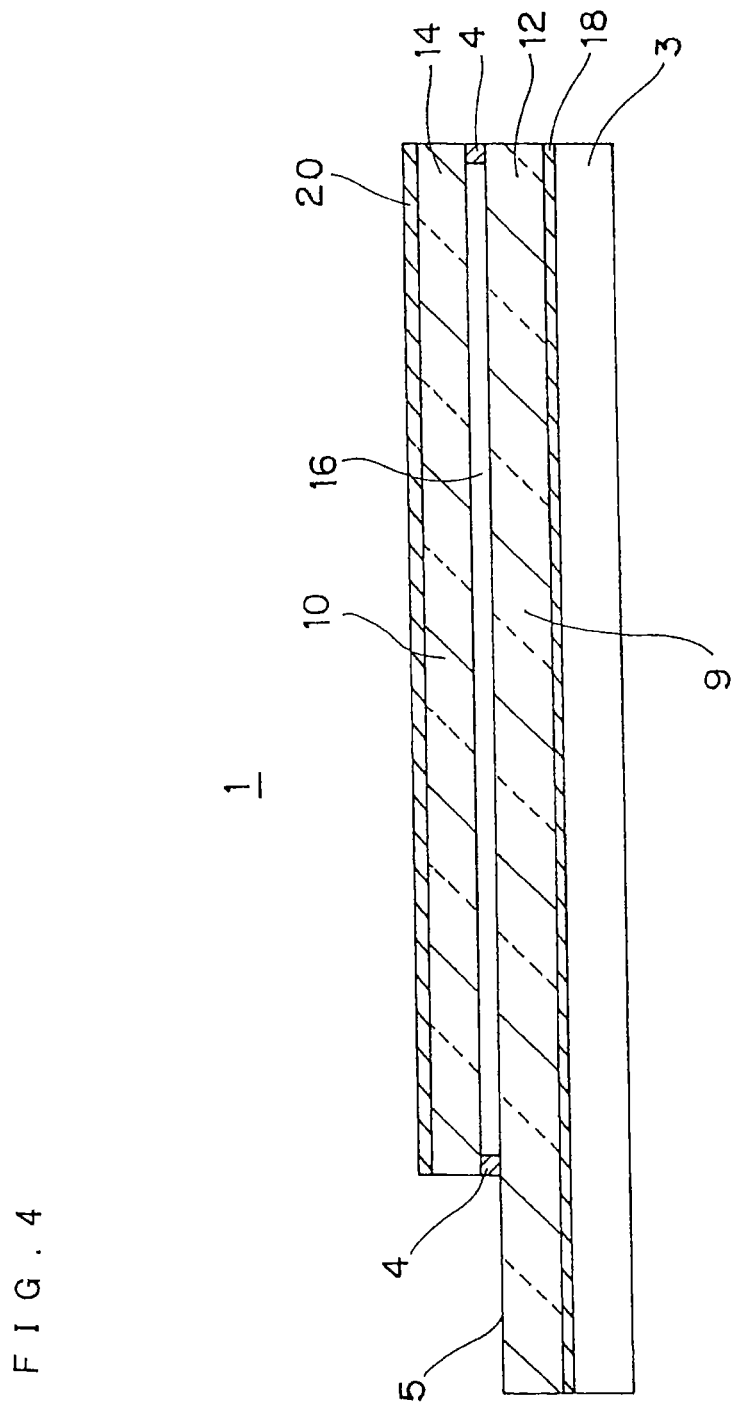
FIG. 4 is a vertical cross-sectional view of a liquid crystal display apparatus.
Figure 5:
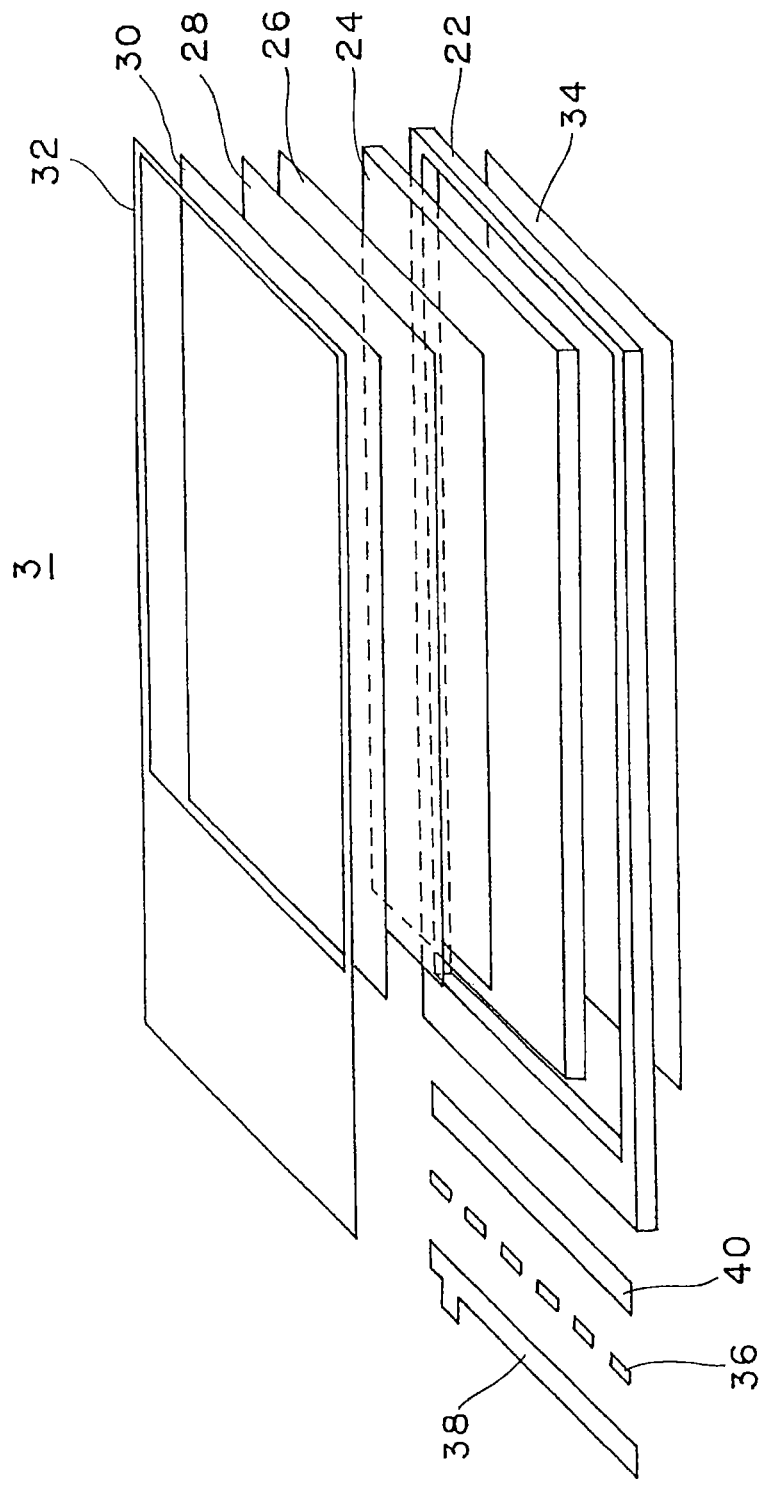
FIG. 5 is an exploded perspective view of the back light.
Figure 6:
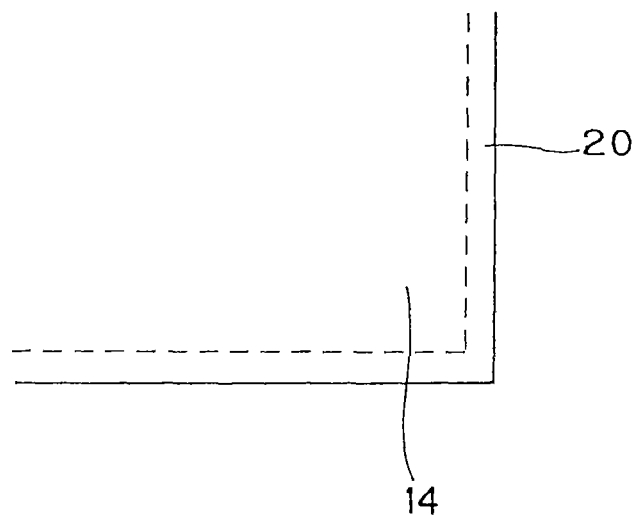
FIG. 6 is a drawing illustrating a relationship between the optical film and the counter substrate of the related art in a state in which the optical film is protruded.

A structure of the liquid crystal display apparatus 1 will be described with reference to FIG. 4 and FIG. 5.

The liquid crystal display apparatus 1 includes a liquid crystal cell 2 and a back light 3 combined with each other.

The liquid crystal cell 2 includes an array substrate 12 and a counter substrate 14 adhered to each other with a sealing member 4 by the intermediary of a liquid crystal layer 16.

Gate lines and signal lines are formed on an upper surface of a glass substrate 9 of the array substrate 12 orthogonally to each other, and pixel portions each including a TFT (Thin Film Transistor) and a pixel electrode are arranged at intersections thereof in a matrix pattern. An optical film 18 formed of a polarizing plate or a retardation film is adhered to a lower surface of the array substrate 12. The array substrate 12 is formed to be larger than the counter substrate 14, and a shelf portion 5 for mounting a driver IC for driving the liquid crystal cell 2 is provided.

Figure 2:
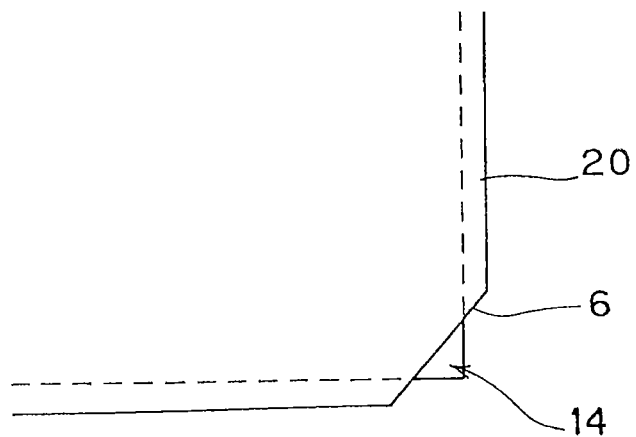
FIG. 2 is a plan view illustrating a relationship between a counter substrate and an optical film.

On a lower surface of the glass substrate 10 of the counter substrate 14, a colored layer including resists colored in different colors (R, G, B), a black matrix, and a transparent electrode applied to an upper surfaces of the colored layer and the black matrix are formed. An optical film 20 including the polarizing plate or the retardation film is adhered to an upper surface of the counter substrate 14. A corner of the optical film 20 includes a notched portion 6 formed by cutting a triangle shape away therefrom. The size of the notched portion 6 is such that one side of the triangle cut away is 0.3 mm as illustrated in FIG. 2, for example.

Opposing surfaces of the array substrate 12 and the counter substrate 14 each include an alignment film formed thereon, and a liquid crystal layer 16 is formed between the array substrate 12 and the counter substrate 14.

The back light 3 includes a light guide plate 24 stored in a frame-shaped frame 22 formed of synthetic resin, a diffusion sheet 26, and prism sheets 28 and 30 laminated on an upper surface of the light guide plate 24, and a frame-shaped light-shielding double-side adhesive tape 32 for adhering the liquid crystal cell 2 is adhered to an upper surface of the prism sheet 30. A reflection sheet 34 is arranged on a lower surface of the light guide plate 24. A plurality of LEDs 36, which function as a light source, are arrayed between the frame 22 and the light guide plate 24, and the LEDs 36 and the LED flexible substrate 38 are fixed to the frame 22 with a fixing tape 40.

Subsequently, a method of manufacturing the liquid crystal display apparatus 1 will be described in sequence.

First of all, a large mother substrate (hereinafter, referred to as a "mother array substrate") for forming pieces of array substrates 12 is prepared. In order to do so, a film is formed on the front surface of the glass substrate, which serves as the mother array substrate. In this case, a metal film is formed by Spattering Method, and an insulating film is formed by CVD method. Both are formed by adhering a metal film or an insulating film on a glass substrate by charging gas into a vacuum chamber to cause a physical or chemical reaction.

Subsequently, a resist is applied on the glass substrate having the metal film or the insulating film formed thereon to form a resist layer.

Subsequently, an exposure apparatus is used to expose the glass substrate on which a resist layer is applied to perform development. In other words, a mask on which the pattern is drawn is used to print the pattern on the resist layer.

Subsequently, the resist layer on which the pattern is printed is covered with a mask, wet etching or dry etching is performed thereon, and unnecessary resist layer, the metal film, and the insulating film other than the pattern are removed.

Subsequently, the unnecessary resist layer remaining on the patterned metal film or insulating film is separated from the glass substrate to leave a required film only.

As regards the above-described processes, a single metal film or insulating film is formed from a single mask. Therefore, these processes are performed repeatedly by a plurality of times to form wiring for gate lines, the insulating film, wiring for the signal lines, insulating film, the TFTs, and the pixel electrodes.

Subsequently, the counter substrate 14 is formed by pattern formation in the same manner as the process of manufacturing the array substrate 12 by forming a black matrix, colored layer of RGB, and a transparent electrode on a glass substrate, which becomes a large mother substrate for forming pieces of the counter substrates 14 (hereinafter, referred to as "mother counter substrate").

Subsequently, the alignment film of the mother array substrate and the alignment film of the mother counter substrate 140 are applied by roller transfer. The alignment film is provided for aligning the orientation of liquid crystal molecules.

Subsequently, a rubbing process is performed on the alignment film on the mother array substrate and the alignment film on the mother counter substrate, respectively. For example, a drum is wrapped with a cloth and the surface of the alignment film is mechanically rubbed, so that the liquid crystal molecules align in the rubbing direction.

Subsequently, the sealing members 4 are formed in a frame shape along outer peripheral areas of the pieces of the counter substrates 14 on the mother counter substrate.

Subsequently, the mother array substrate and the mother counter substrate are adhered with the sealing members 4.

Subsequently, liquid crystal is injected into a space between the mother array substrate and the mother counter substrate adhered to each other by, for example, dropping the liquid crystal, so that the liquid crystal layer 16 is formed.

Subsequently, the sealing members 4 that adhere the mother array substrate and the mother counter substrate to each other are irradiated with a UV light beam and cured.

Subsequently, after the sealing members 4 have cured, the adhered mother substrates are divided into pieces of the liquid crystal cells 2 by performing a scribe and break process, whereby individual liquid crystal cells 2 are formed.

Subsequently, the optical films 18 and 20 are adhered to the surfaces of the array substrate 12 and the counter substrate 14 of the liquid crystal cell 2. In such a case, as described above, the corner of the optical film 20 to be adhered to the counter substrate 14 is cut away in a triangle shape and hence includes the notched portion 6.

Figure 1:
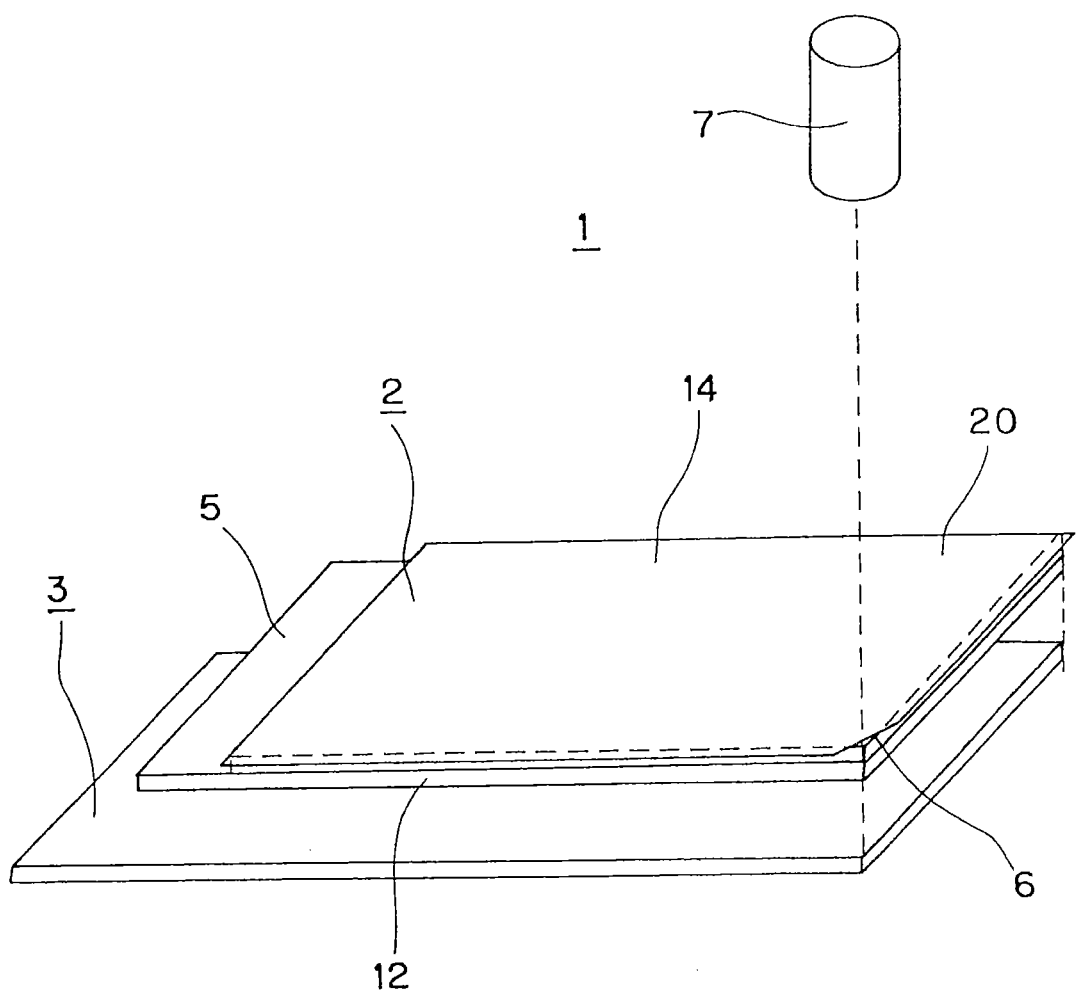
FIG. 1 is a perspective view of a state in which a back light is being mounted on an array substrate according to an embodiment of the present invention.
Figure 3:
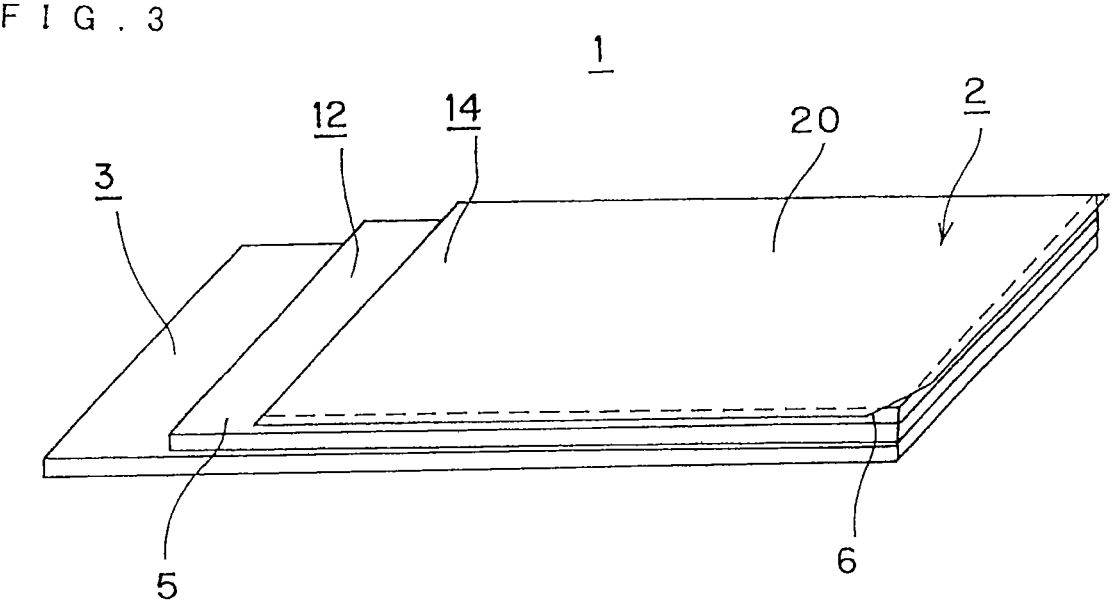
FIG. 3 is a perspective view of a state in which a liquid crystal cell and a back light are mounted.

Subsequently, the back light 3 is aligned with the liquid crystal cell 2 as illustrated in FIG. 1, and then mounted in an overlapped manner as illustrated in FIG. 3. The back light 3 is fixed to the lower surface of the array substrate 12 of the liquid crystal cell 2 by a light-shielding double-side adhesive tape 32. In this case, a corner of the liquid crystal cell 2 on the side opposite from the shelf portion 5 and a corner of the back light 3 need to be matched. Therefore, as illustrated in FIG. 1, the corner of the liquid crystal cell 2 and the corner of the back light 3 are shot by a camera 7 from an upper surface of the liquid crystal cell 2, and the back light 3 is shifted so as to match the position of the corner of the liquid crystal cell 2. In this case, since the corner of the optical film 20 has the notched portion 6 cut away in the triangular shape, even though the optical film 20 is protruded outward from the counter substrate 14, the positions of the corner of the liquid crystal cell 2 and the position of the corner of the back light 3 may be confirmed through the position of the notched portion 6, so that accurate alignment is achieved. In particular, the optical film 20 in these days often protrudes from the counter substrate 14 due to the frame narrowing of the liquid crystal cell 2. Even in such a case, the corner of the counter substrate 14 and the corner of the back light 3 can be recognized from the notched portion 6 accurately by the camera 7.

Subsequently, a driver IC, which is not illustrated, is mounted on the shelf portion 5 of the liquid crystal cell 2 on which the back light 3 is mounted via the flexible substrate, whereby the liquid crystal display apparatus 1 is completed.

According to the embodiment, the corner of the counter substrate 14 is prevented from being covered with the optical film 20 by providing the notched portion 6 at the corner of the optical film 20, so that alignment between the corner of the liquid crystal cell 2 and the corner of the back light 3 is achieved accurately. Therefore, when the liquid crystal cell 2 and the back light 3 are combined, light leakage and the like does not occur.

In the embodiment described above, only one of the corners of the rectangular optical film 20 is cut away. However, the notched portion 6 may be provided at corners opposing each other or adjacent corners to perform alignment at a plurality of positions in order to achieve further accurate alignment.

As regards the shape of the notched portion 6, the mode of the triangle shape has been exemplified in the embodiment. However, what is essential is that the corner of the liquid crystal cell 2 can be inspected through the notched portion 6, and hence the shape is not limited thereto as a matter of course. For example, by forming holes through the optical film at positions corresponding to four corners of each optical film before being cut out into pieces with a round hole punch or the like, the shape of the notched portion at the corners when the optical film is cut out into pieces becomes a fan shape. A rectangular shape is also applicable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a liquid crystal display apparatus comprising:
   forming a liquid crystal cell, in which a liquid crystal layer is held between an array substrate and a counter substrate;
   adhering an optical film having a notched, portion formed by cutting at least one of corners away on a front surface of the array substrate or the counter substrate of the liquid crystal cell;
   aligning a corner of the liquid crystal cell and a corner of a back light at the notched portion of the optical film; and
   mounting the back light so as to overlap with the liquid crystal cell.

2. The method of manufacturing a liquid crystal display apparatus according to claim 1, wherein aligning the corner of the liquid crystal cell and the corner of the back light is performed by observing the corners through the notched portion from above the counter substrate.

3. The method of manufacturing a liquid crystal display apparatus according to claim 1, wherein the optical film is a polarizing plate or a retardation film.

4. A liquid crystal display apparatus comprising:
   a liquid crystal cell formed by adhering an array substrate and a counter substrate via a liquid crystal layer; and a back light, wherein
   at least one of four corners of an optical film to be adhered to the array substrate or the counter substrate is cut away to form a notched portion,
   an area of the optical film is larger than the array substrate or the counter substrate at places except at the notched portion.

5. The liquid crystal display apparatus according to claim 4, wherein the optical film is a polarizing plate or a retardation film.

6. The liquid crystal display apparatus according to claim 4, wherein a side of the notched portion is formed to be inclined to a side of the optical film, and the corners of the liquid crystal cell and the backlight are exposed in the notched portion.

7. The liquid crystal display apparatus according to claim 4, wherein, at the notched portion, a fringe of the optical film runs in a direction inclined to directions of fringes of the optical film in other parts so that a corner portion of the back light is observable through the array and counter substrates; which are transparent, when a frame covering a non-viewing fringe area of the liquid crystal cell is detached.

8. A method of manufacturing a liquid crystal display apparatus comprising:
   forming a liquid crystal cell, in which a liquid crystal layer is held between an array substrate and a counter substrate;
   adhering an optical film having a notched portion formed by cutting at least one of corners away on a front surface of the array substrate or the counter substrate of the liquid crystal cell;
   aligning the liquid crystal cell and a back light by observing corners of the liquid crystal cell and the back light through the notched portion of the optical film; and
   mounting the back light to overlap with the liquid crystal cell.

9. A liquid crystal display apparatus comprising:
   a liquid crystal cell formed by adhering an array substrate and a counter substrate via a liquid crystal layer; and
   a back light;
   wherein
   at least one of four corners of an optical film to be adhered to the array substrate or the counter substrate is cut away to form a notched portion,
   dimensions of the optical film are larger than corresponding dimensions of the array substrate or the counter substrate so that fringes of the optical film outwardly protrude from fringes of the array substrate or the counter substrate at least in vicinity of, and except at, the notched portion.

* * * * *